United States Patent [19]

Matsumura et al.

[11] Patent Number: 5,847,763
[45] Date of Patent: Dec. 8, 1998

[54] MOVING PICTURE TRANSMISSION SYSTEM AND MOVING PICTURE TRANSMISSION APPARATUS

[75] Inventors: Yasuko Matsumura; Toshihisa Nakai, both of Tokyo, Japan

[73] Assignee: OKI Electric Industry Co., Ltd., Tokyo, Japan

[21] Appl. No.: 678,624

[22] Filed: Jul. 10, 1996

[30] Foreign Application Priority Data

Jul. 14, 1995 [JP] Japan .................................... 7-178684

[51] Int. Cl.$^6$ ..................................................... H04N 7/32
[52] U.S. Cl. ........................................ 348/416; 348/699
[58] Field of Search ................................... 348/384, 390, 348/400–402, 407, 409–413, 415, 416, 420, 616, 699; 371/32; 382/232, 236, 238; H04N 7/137

[56] References Cited

U.S. PATENT DOCUMENTS

| | | |
|---|---|---|
| 4,827,339 | 5/1989 | Wada et al. . |
| 5,136,371 | 8/1992 | Savatier et al. ......................... 348/409 |
| 5,172,246 | 12/1992 | Yoshida . |
| 5,333,137 | 7/1994 | Fujiyama . |
| 5,400,076 | 3/1995 | Iwamura ................................. 348/416 |
| 5,416,600 | 5/1995 | Matsumi et al. ....................... 348/616 |
| 5,418,571 | 5/1995 | Ghanbari ................................ 348/416 |
| 5,420,872 | 5/1995 | Hyodo et al. .......................... 348/616 |
| 5,453,801 | 9/1995 | Kim . |
| 5,528,284 | 6/1996 | Iwami et al. . |
| 5,550,847 | 8/1996 | Zhu ......................................... 371/32 |
| 5,561,532 | 10/1996 | Ohnishi et al. ........................ 348/616 |
| 5,570,199 | 10/1996 | Tanaka et al. .......................... 348/407 |
| 5,614,958 | 3/1997 | Shikakura ............................... 348/402 |

FOREIGN PATENT DOCUMENTS 2 278 752  12/1994  United Kingdom .

OTHER PUBLICATIONS

Patent Abstracts of Japan, Kuroda Hideo, Encoding and Decoding Device for Picture Signal, JP 61269479, Nov. 28, 1986.
Patent Abstracts of Japan, Yoshino Motoaki, Pictorial Communication Equipment, JP 04109761, Apr. 10, 1992.
Video Codec for Audiovisual Services at p×64 kbits, ITU–T Recommendation H. 261, International Telecommunication Union, pp. 1–25, Mar. 1993.

Primary Examiner—Richard Lee
Attorney, Agent, or Firm—Wenderoth, Lind & Ponack, L.L.P.

[57] ABSTRACT

A moving picture transmission system enhances the quality of a demand-refreshed image without increasing the amount of code to be transmitted. When a picture data error has been detected, a reception side coder transmits to a transmission side decoder information concerning the location of the error detected in a picture frame. Upon receipt of this information, for several frames, beginning with the picture frame that is distorted by the error and continuing up until the picture frame preceding the frame to be transmitted, the transmission side determines a portion that may be distorted by the occurrence of the error or by the transmission of the error, and a picture portion that may be affected by distortion when picture data are to be coded in the inter-frame coding mode. Only the picture portion that the transmission side determines will be affected is forcibly coded in the intra-frame coding picture mode, the other picture portions being coded in the normal manner, and the resultant picture data are transmitted to the reception side.

32 Claims, 9 Drawing Sheets

HIERARCHIAL DIVISIONS OF MOVING IMAGE DATA

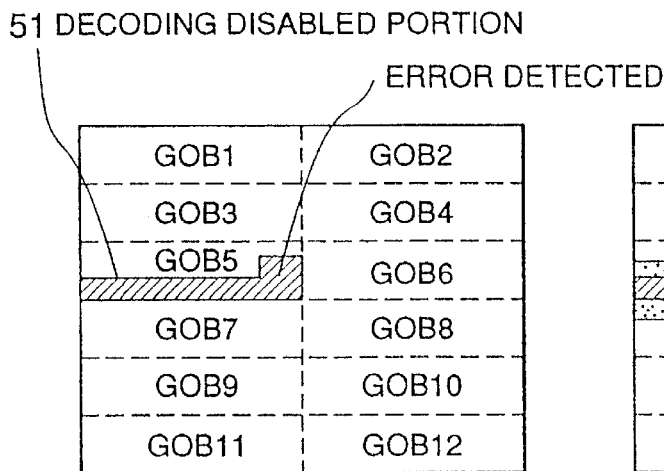
(a) ERROR FRAME (FRAME A)
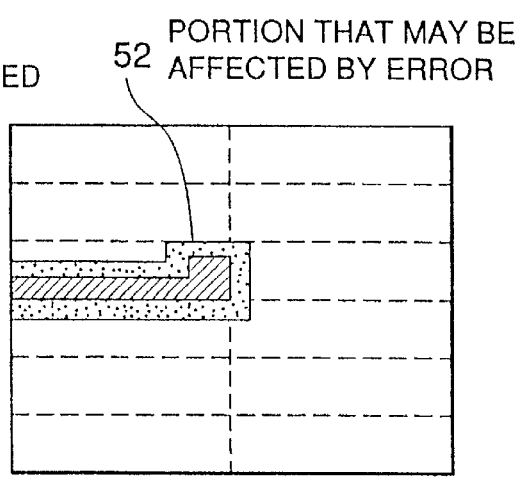
(b) FRAME B
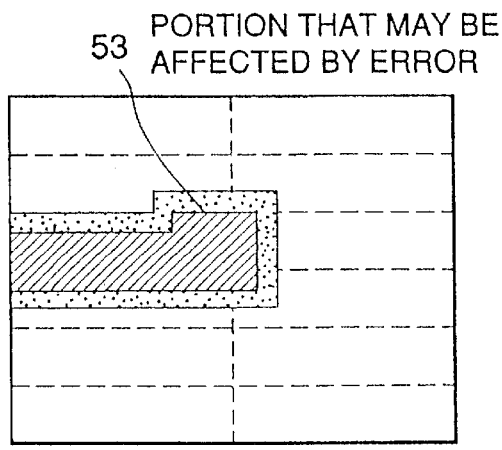
(c) FRAME C
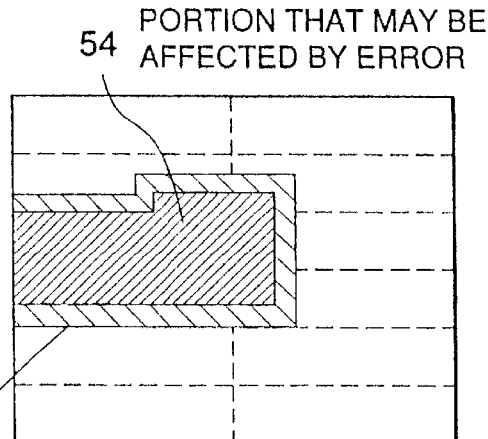
(d) FRAME D (a1) COD FOR FRAME A (a2) DECODING DISABLED PORTION OF FRAME A (b1) COD FOR FRAME B (b2) FRAME B (c1) COD FOR FRAME C (c2) FRAME C (d1) COD FOR FRAME D (d2) FRAME D

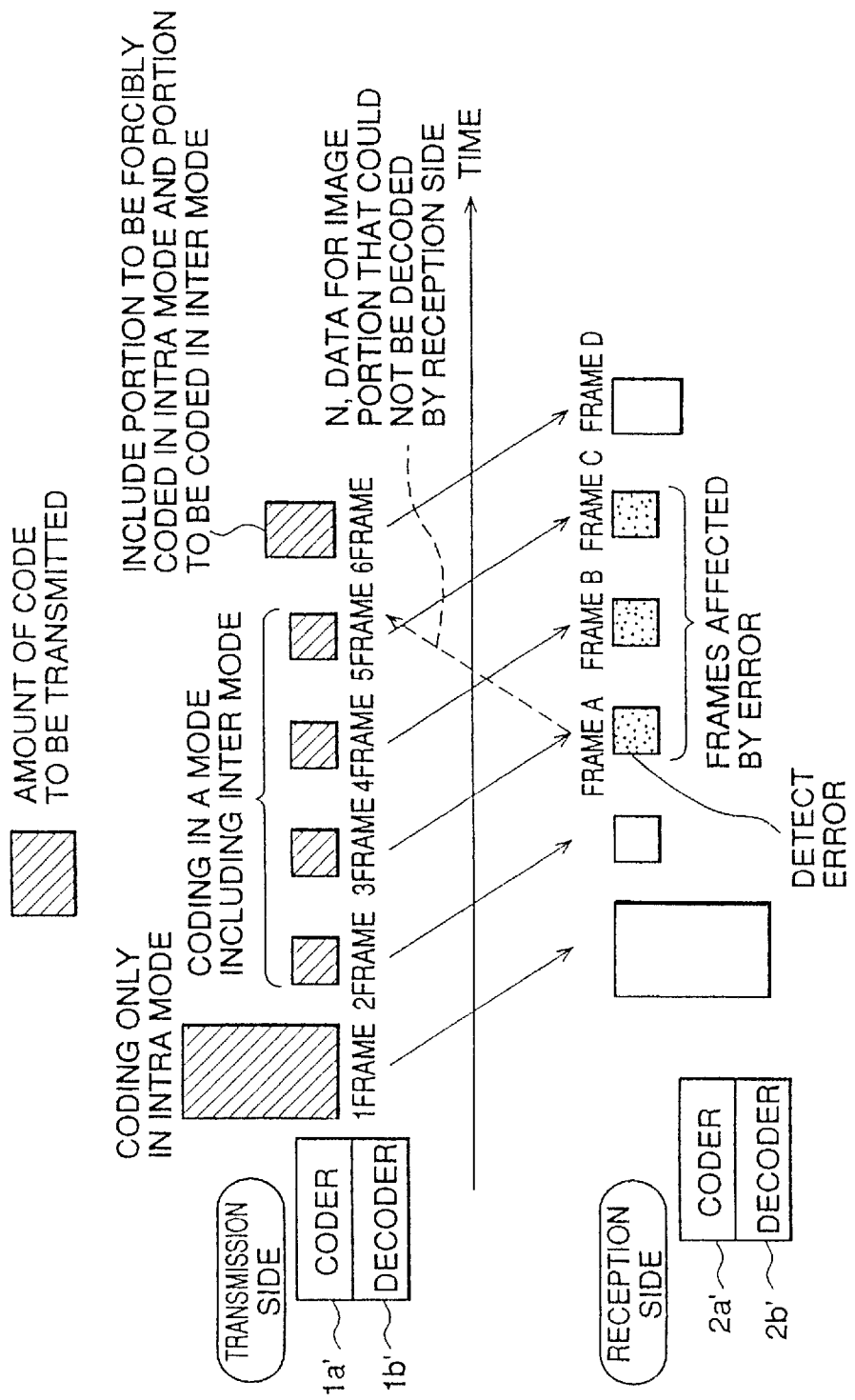

ERRONEOUS TRANSMISSION TO GOB 6 BECAUSE OF NO SYNCHRONOUS CODE

101 DECODING DISABLED PORTION

ERROR DETECTED (a) ERROR FRAME (FRAME A)

102 PORTION THAT MAY BE AFFECTED BY ERROR (b) FRAME B

103 PORTION THAT MAY BE AFFECTED BY ERROR (c) FRAME C

104 PORTION THAT MAY BE AFFECTED BY ERROR (d) FRAME D

105 ROUGHLY SHADED PORTION TO BE FORCIBLY CODED IN INTRA MODE

MOVING PICTURE TRANSMISSION SYSTEM AND MOVING PICTURE TRANSMISSION APPARATUS

REFERENCE TO RELATED APPLICATION

This application claims the priority right under 35 U.S.C. § 119, of Japanese Patent Application No. Hei 07-178684 filed on Jul. 14, 1995, the entire disclosure of which is incorporated herein by reference.

BACKGROUND OF THE INVENTION

1. Field of the Invention

The present invention relates to a moving picture transmission system, and a moving picture transmission apparatus that can be applied, for example, as a demand refresh system for transmitting compressed moving picture data.

2. Related Art

For digital communication, an enormous amount of image data are compressed and redundancies are removed before the resultant data are transmitted. The moving picture coding method that is specified in reference document (1), ITU-T Recommendation H. 261 (TTC Standards (Higher Layer Protocol Coding Method: Recommendation JT-H. 261)), is a typical compression and coding method. When this compression method is employed, a difference in time between a current frame and a preceding frame is coded (called an inter-frame coding mode (INTER mode)) to remove redundancies in the time axial direction. Or an orthogonal transform is performed for a picture without calculating a time difference, and the resultant data are coded (called an intra-frame coding mode (INTRA mode)) to eliminate redundancies in the spacial direction.

If an error occurs in compressed image data that are thus coded, a picture is greatly distorted, and because a time difference between the current frame and the preceding frame is coded, the distortion in the image will be transmitted to a succeeding frame. To cope with such an error, according to the above described reference document (1), a "fast update request" function is provided for a system, such as a multi-point conference system, that enables bidirectional communication.

When an error is detected at the reception side, a fast update request signal is transmitted to the transmission side. Upon the receipt of the signal, a coding device at the transmission side forcibly codes a succeeding one picture frame by employing the intra-frame coding mode, and transmits the resultant data. The frame that is coded by employing the intra-frame coding mode will not be affected by the distortion of the preceding frame.

A process for coding a single picture frame entirely or partially by employing a coding mode that is not affected by the preceding image distortion and for transmitting the resultant frame (if the coding method H. 261 referred to in the reference document (1) is employed, this process corresponds to the forcible coding of a single image frame entirely or partially in the intra-frame coding mode) is called "refreshing," and a picture that is obtained by refreshing is called a refresh picture.

Transmission of a refresh signal from the transmission side in response to an update request signal from the reception side is called "demand refreshing."

FIG. 1 is a diagram for explaining a conventional demand refresh method. In FIG. 1, the elapsed time is calculated from the left to the right as a transmission side codes each picture frame and transmits the result to a reception side. The area sizes of a shaded square represent the amount of code that is to be transmitted for a single picture frame. Generally, when coding is performed only by employing the intra-frame coding mode, the amount of code is greater than that which is provided when coding is performed by not only employing the intra-frame coding mode but also employing the inter-frame coding mode.

Supposing that an error is detected when the third frame in FIG. 1 is to be decoded, the reception side transmits a fast update request signal to the transmission side. Upon the receipt of the fast update request signal, the transmission side forcibly codes a picture frame to be transmitted next (the sixth frame) by employing the intra-frame coding mode.

Compared with the amount of code that is acquired when employing the inter-frame coding mode, there is a drastic increase in the amount of code that is acquired when the intra-frame coding mode is used. When the fast update request function, as prepared according to the ITU-T Recommendation H. 261 in the reference document (1), is employed for the recovery of a picture that was distorted because of an error, the entire one picture frame must be transmitted by employing the intra-frame coding picture mode. If a coding parameter is changed to avoid the overflow of a buffer, which is caused by an increase in the amount of code while employing the intra-frame coding picture mode, the quantization is performed roughly, and there is picture deterioration due to block distortion.

SUMMARY OF THE INVENTION

It is, therefore, an object of the present invention to provide a moving picture transmission system, and a moving picture transmission apparatus that can perform demand refreshing for coded moving picture data more efficiently than the conventional system and apparatus, even though the amount of code to be transmitted is not increased and even when a data error occurs as a result of an influence encountered along a transmission channel, so that the quality of a picture that is decoded can be improved.

To achieve the above object, according to the present invention, a moving picture transmission system, which comprises a moving picture transmission device A, for compressing and coding moving picture data that are input and for outputting resultant coded moving picture data; and a moving picture transmission device B, for decoding said resultant coded moving picture data, is provided that has the following structure.

The moving picture transmission device B of the present invention includes an information transmission apparatus for, when an error is detected in data for a picture frame that is obtained by decoding the resultant coded moving picture data or when a picture range of the resultant coded moving picture data that can not be decoded is detected, transmitting to the moving picture transmission device A a location of the error that is detected as error detection location information, or the picture range that can not be decoded as decoding disabled range information.

The moving picture transmission device A of the present invention includes an estimation apparatus, for, from the error detection location information or the decoding disabled range information that is received, identifying an error location in a picture frame or a decoding disabled range and for determining a portion of picture data that is affected by the error detected location, or by the decoding disabled range; and a refreshed picture transmission apparatus for generating refreshed picture data by compressing and coding the picture data by employing a result obtained by the estimation apparatus and for transmitting the refreshed picture data to the moving picture transmission device B.

According to the present invention, when the moving picture transmission device B for performing decoding detects an error in data for a picture frame, which is obtained by decoding the coded moving picture data, the moving picture transmission device B transmits, as an error detected location, the location of the detected error information to the moving picture transmission device A. From the received information, the moving picture transmission device A for performing coding identifies the error detected location in the picture frame, and determines a portion of picture data that is affected by the error detection location. The moving picture transmission device A compresses and codes the picture data by employing the estimation result to produce refreshed picture data, and transmits the refreshed picture data to the moving picture transmission device B.

With the thus described arrangement, upon receipt of the error detection location information from the device for performing decoding, the device for performing coding can determine a picture portion that may be affected by the error on the picture, and can perform refreshing of that portion for transmission. Therefore, while the amount of code to be transmitted is not increased, demand refreshing is performed more efficiently than it is conventionally, even if a data error occurs as a result of an influence encountered along a transmission channel, so that the quality of the decoded picture can be improved.

The moving picture transmission device B for performing decoding detects a picture range of coded moving picture data that can not be decoded, and transmits to the moving picture transmission device A the picture range as decoding disabled range information. Upon receipt of this information, the moving picture transmission device A identifies the decoding disabled range, and determines an affected portion of the picture data by the decoding disabled range. The moving picture transmission device A compresses and codes the picture data by employing the estimation result, produces refreshed picture data, and transmits the data to the moving picture transmission device B.

With this arrangement, since, upon receipt of decoding disabled range information from the device for decoding, the device for coding can determine a picture portion that may be affected by the decoding disabled range and can transfer a refreshed picture portion, the amount of code to be transmitted is not increased, and demand refresh can be performed more efficiently than it is conventionally, even if a data error occurs as a result of an influence encountered along a transmission channel, so that the quality of the decoded picture can be improved.

BRIEF DESCRIPTION OF THE DRAWINGS

FIG. 6 is a diagram for explaining the process for the first embodiment by which a transmission side determines portions that may be affected by errors in frames A through D;

FIG. 9 is an explanatory diagram for a demand refresh system according to a third embodiment.

DETAILED DESCRIPTION OF THE PREFERRED EMBODIMENTS

The preferred embodiments in which the present invention is applied as a moving picture demand refresh system will now be described while referring to the accompanying drawings. According to the embodiments, in a demand refresh method, according to which one moving picture frame is divided into regions having specific sizes and data for each divided region are coded and the coded data are transferred, and according to which the reception side decodes the coded moving picture data that are received and notifies the transmission side if an error has occurred, and the transmission side transmits a refreshed picture that is not affected by the error, the reception side transmits, as a notice of an error to the transmission side, information concerning an error location in a picture frame. The transmission side determines a portion that may be affected by the error and refreshes that portion, and thereafter transmits the refreshed portion.

Further, in a demand refresh method, according to which one moving picture frame is divided into regions having specific sizes and data for each of the divided regions are coded and the coded data are transferred, and according to which the reception side decodes the coded moving picture data that are received and notifies the transmission side if an error has occurred, and the transmission side transmits a refreshed picture that is not affected by the error, the reception side transmits to the transmission side, as notification of an error, information concerning a portion of the picture frame that the reception side could not decode. The transmission side determines a portion that may be affected by the error and refreshes that portion, and thereafter transmits the refreshed portion.

In addition, when the transmission side has received the error location information, as notification of an error, from the reception side, the transmission side employs the search range of a motion vector for coding the moving picture to estimate the extent of a portion that may be affected by the error. Further, for the coding of a moving picture, the transmission side stores information indicating whether a region is coded or not, and upon the receipt of, as an error notice, the error location information from the reception side, the transmission side employs the stored information concerning the coded region to estimate the extent of a portion that may be affected by the error.

[First embodiment]

Figure 1:
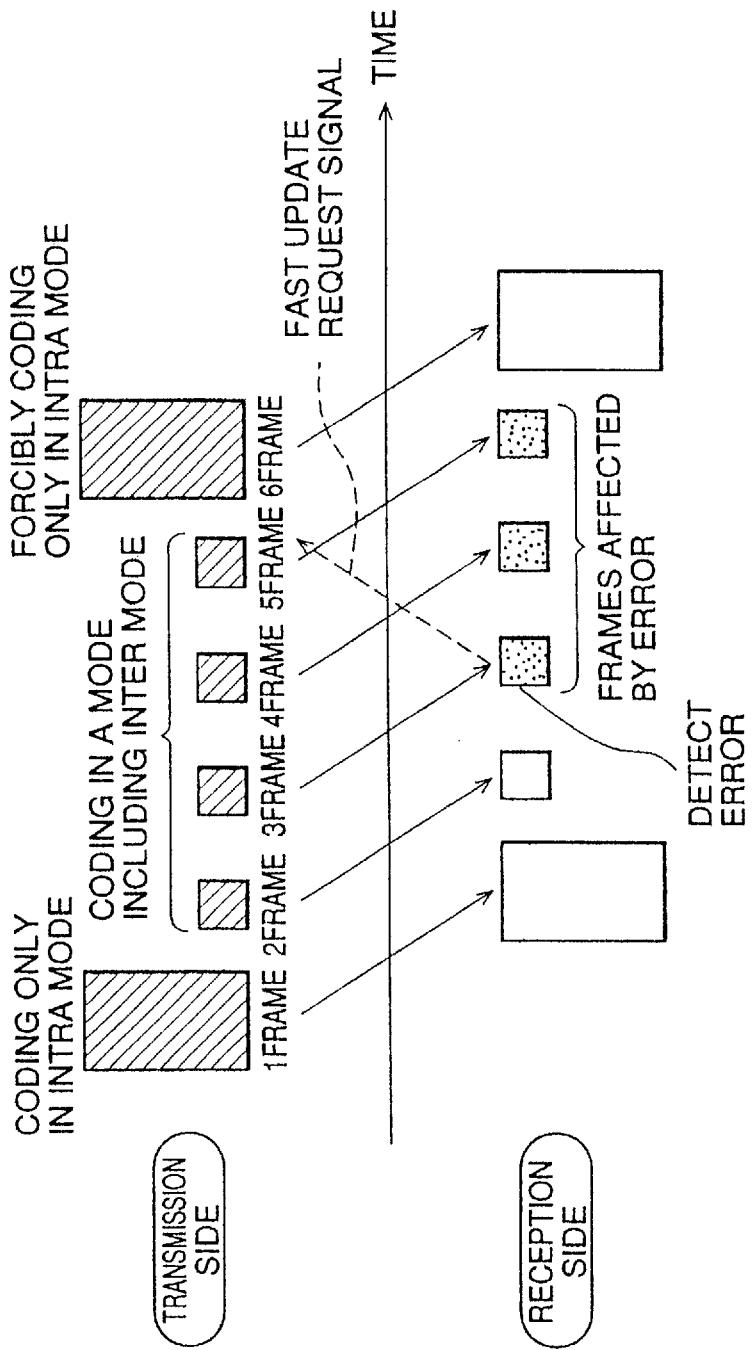
FIG. 1 is a diagram for explaining a conventional demand refresh method.
Figure 2:
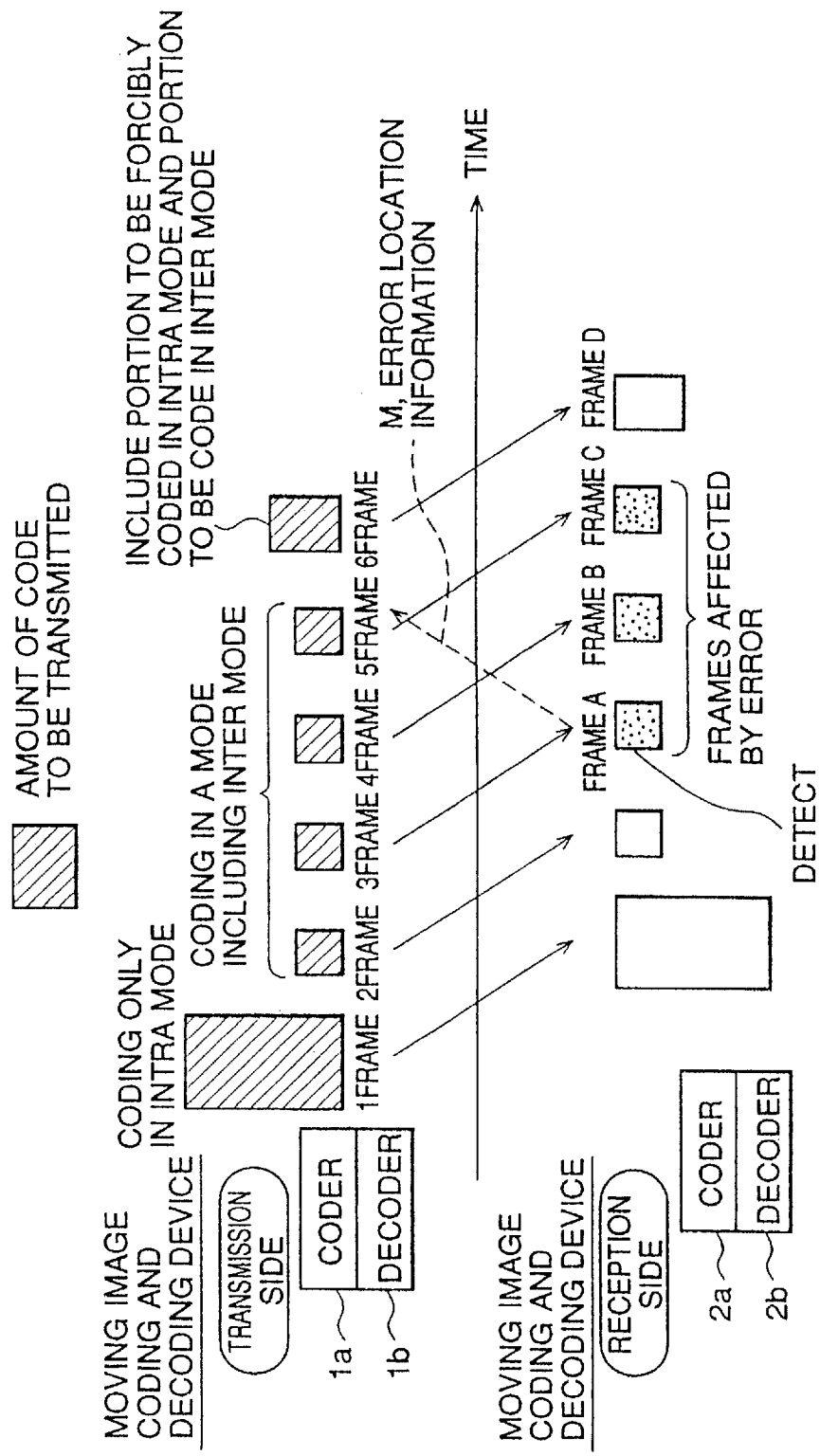
FIG. 2 is a diagram for explaining a demand refresh system according to a first embodiment of the present invention.

FIG. 2 is a diagram for explaining a demand refresh system according to a first embodiment of the present invention. In FIG. 2, it is assumed that the elapsed time is calculated from the left to the right, and a moving picture coding and decoding device on the transmission side codes each picture frame and transmits the coded frame to the reception side. The dimension of each shaded rectangle represents the amount of code that is to be transmitted for a corresponding picture frame. The moving picture coding and decoding device on the transmission side includes a moving picture coder 1a and a moving picture decoder 1b, and a moving picture coding and decoding device on the reception side has a moving picture coder 2a and a moving picture decoder 2b. Although, according to a conventional demand refresh method, when an error is detected, the reception side transmits to the transmission side a fast update request signal as an error notice, in the first embodiment, information M concerning a detected error location in one picture frame is transmitted as an error notice from the reception side moving picture coder 2a to the transmission side When the moving picture decoder 1b.

Figure 3:
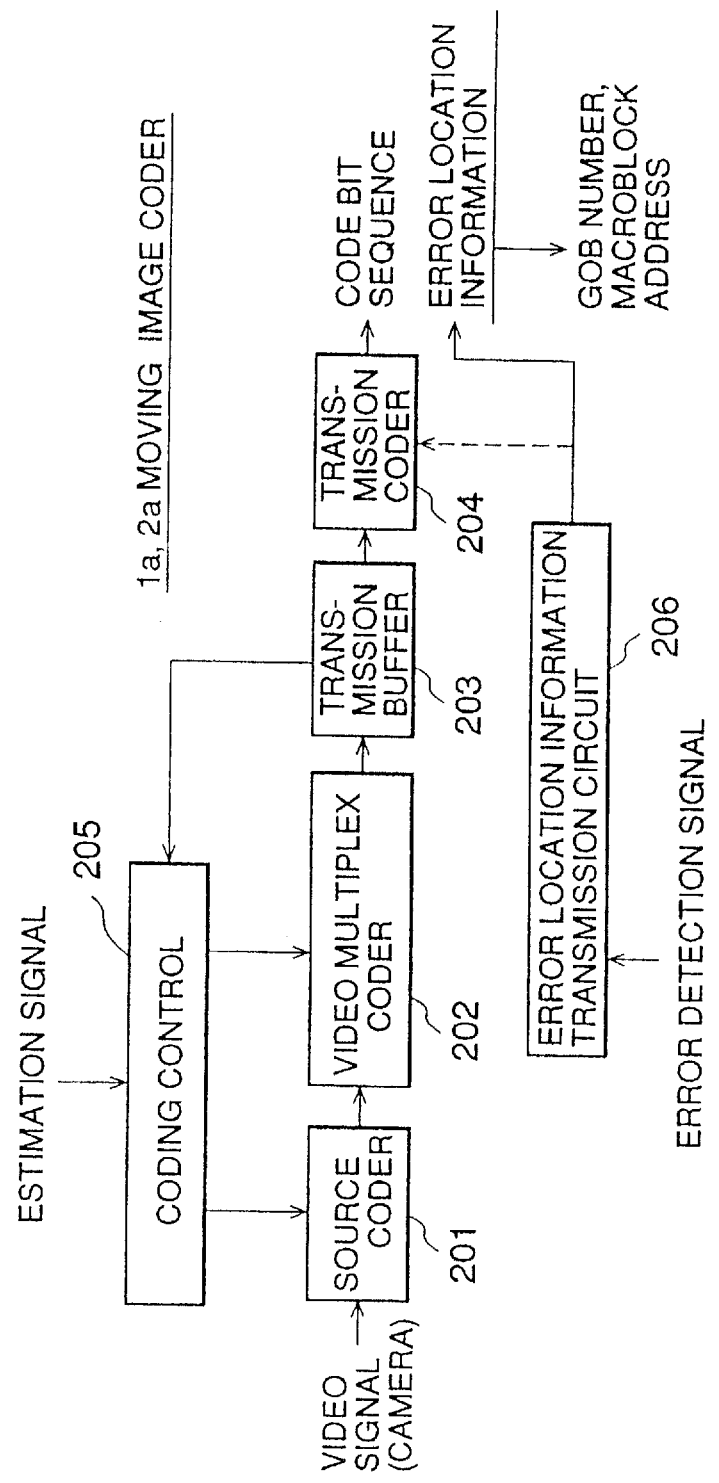
FIG. 3 is a functional diagram illustrating a moving picture coder according to the first embodiment.

When the moving picture decoder 1b on the transmission side has received the information M concerning the error location, for several frames (three frames in FIG. 2), up until a picture frame that precedes a frame that is to be transmitted, the transmission side determines picture portions that may be distorted by the error or by the transmission of the error, and the picture portions that may be affected by such distortion when they are the next to be coded in the inter-frame coding mode. Then, only the picture portions that the transmission side assumes to be affected are forcibly coded in the intra-frame coding picture mode, and the other picture portions are coded in the normal manner.
(Structures of moving picture coders 1a and 2a):

FIG. 3 is a functional diagram for a moving picture coder. In FIG. 3, the moving picture coder is constituted of a source coder 201; a video multiplex coder 202; a transmission buffer 203; a transmission coder 204; a coding control 205; and an error location information transmission circuit 206.

Figure 5:
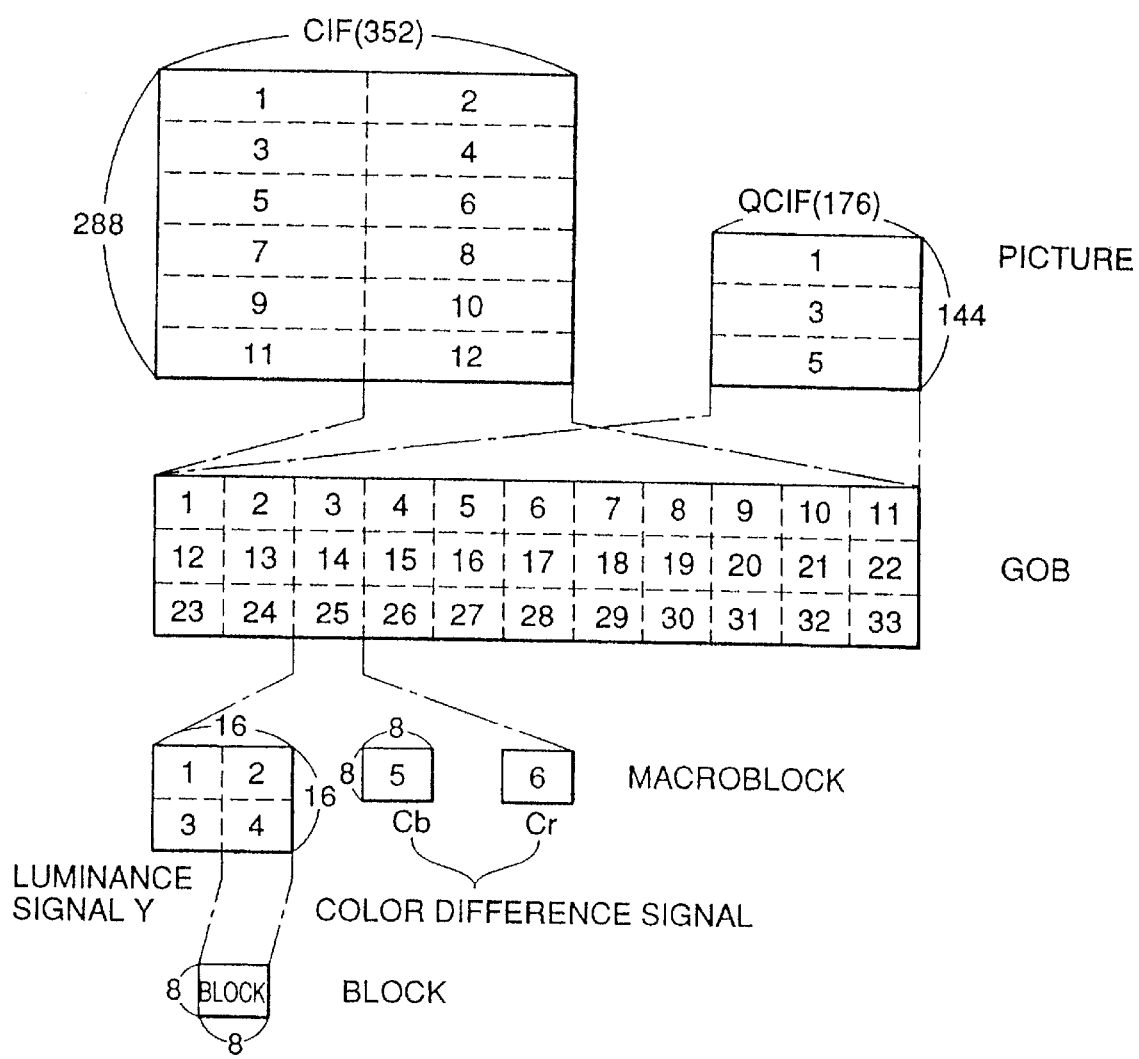
FIG. 5 is an explanatory diagram for the hierarchial divisions of moving picture data.
Figure 7A:
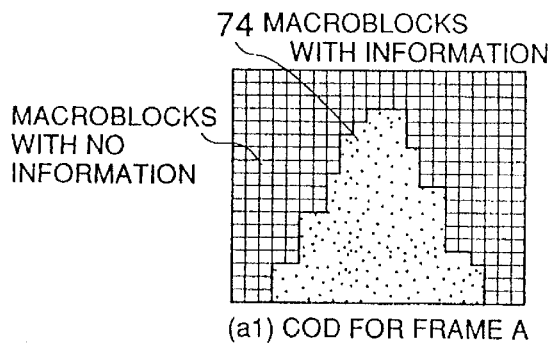
FIG. 7 is a diagram for explaining the process for the second embodiment by which the transmission side determines portions that may be affected by errors in frames A and B.
Figure 7B:
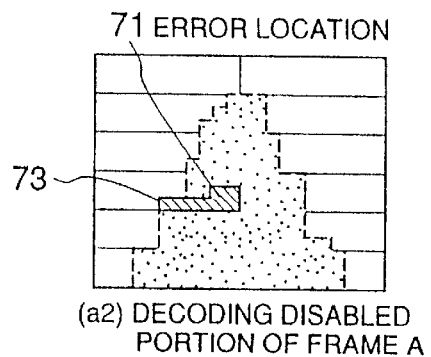
Figure 7C:
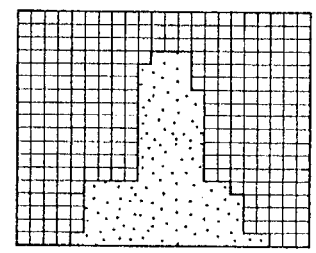
Figure 7D:
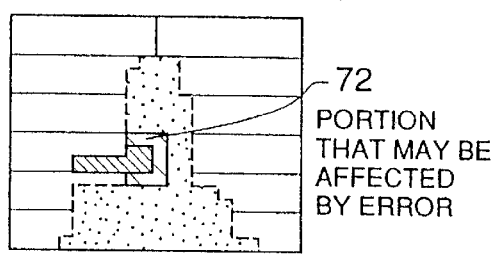
Figure 8A:
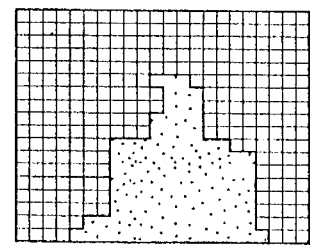
FIG. 8 is a diagram for explaining the process for the second embodiment by which the transmission side determines portions that may be affected by errors in frames C and D.
Figure 8B:
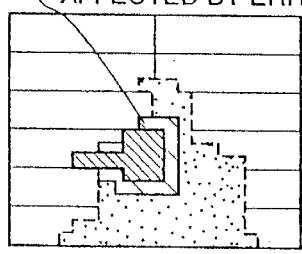
Figure 8C:
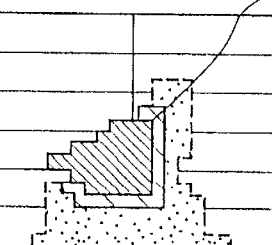
Figure 8D:
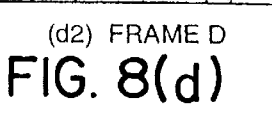

Video signals, which are original data for moving pictures, are represented by the CIF (Common Intermediate Format) and the QCIF (Quarter CIF (¼ CIF)). To code the moving picture data, the data are divided in a hierarchial manner into a GOB (Group Of Blocks), a macroblock and an 8×8 pixel block, as is shown in FIG. 5 for explaining the hierarchial divisions of moving picture data. The numbers (CIF: 1 through 12, QCIF: 1, 3, 5) in pictures indicate GOB numbers; numbers (1 through 33) in the GOB indicate macroblock addresses; and numbers (1 through 6) in the macroblock indicate block numbers. The numbers (8) beside the block indicate the number of pixels for each side of a block.

In the moving picture coder 1a, an input video signal is coded by source coder 201. The source coder 201 first estimates the motion between frames for each macroblock. The source coder 201 then performs an orthogonal transform of a prediction error for each block, and quantizes the result. The prediction process is normally performed in the inter-frame coding mode; however, at the time of a change of scenes, original data for a moving picture is employed for orthogonal transform (intra-frame coding mode). Whether orthogonal transform should be performed for the prediction error for motion compensation between frames (inter-frame coding mode), or for the original data of a moving picture (intra-frame coding mode) is determined by comparing variance of prediction error with those of the original data.

It is preferable that a mode for reducing the amount of code can be selected. In the prior art, when a fast update request signal is received, the succeeding picture frame is coded in the intra-frame coding mode. On the other hand, in the first embodiment of the present invention, when error location information is received, a portion that may be affected by distortion due to an error is estimated, and the portion is forcibly coded in the intra-frame coding mode.

A DCT (Discrete Cosine Transform) is employed for the orthogonal transform, by which data that are expressed by using pixel regions are transformed to data that are expressed by using frequency regions. The data that are now expressed by using frequency ranges and quantized are supplied to the video multiplex coder 202. The video multiplex coder 202 performs variable length coding of the data that are coded by the source coder 201, and further multiplexes header information.

The header information is constituted of a frame header (picture start code (a synchronous code for acquiring synchronization), a temporal reference, picture type information, and spare information), a GOB header (a GOB start code (a synchronous code for acquiring synchronization), a GOB number, quantizer information, and spare information), and a macroblock header (macroblock address, macroblock type information, quantizer information, a motion vector information, and a coded block pattern).

The data that are respectively coded and multiplexed by the source coder 201 and the video multiplex coder 202 are transmitted to the transmission buffer 203. The transmission buffer 203 is a memory circuit for maintaining a constant transmission speed. The transmission buffer 203 informs the coding control 205 of the state of the buffer. The coding control 205 provides a control signal to the source coder 201 to instruct the change in the amount of generated information. Further, the coding control 205 supplies a control signal to the video multiplex coder 202 so as to provide the content of the instruction concerning the change in the amount of information that is generated, and so as to control the volume of the data flow to the transmission buffer 203.

The transmission buffer 203 reads multiplexed data at a required time and transmits them to the transmission path coder 204. The transmission coder 204 inserts a dummy bit into the transmission buffer 203 when it is empty, and adds an error correction signal to the output of the transmission buffer 203, and outputs a coded bit sequence.

When the error location information transmission circuit 206, of the moving picture coder 2a on the reception side, that is the feature of the present invention, receives an error detection signal (including information concerning an error location) from the reception side moving picture decoder 2b, the error location information transmission circuit 206 outputs error location information. The error location information may be output via the transmission coder 204 or may be output directly to a transmission channel.

In the first embodiment, upon receipt of the error location information from the reception side, the transmission side predicts what portion of a decoded image frame may be affected by distortion due to an error.
(Structures of moving picture decoders 1b and 2b)

Figure 4:
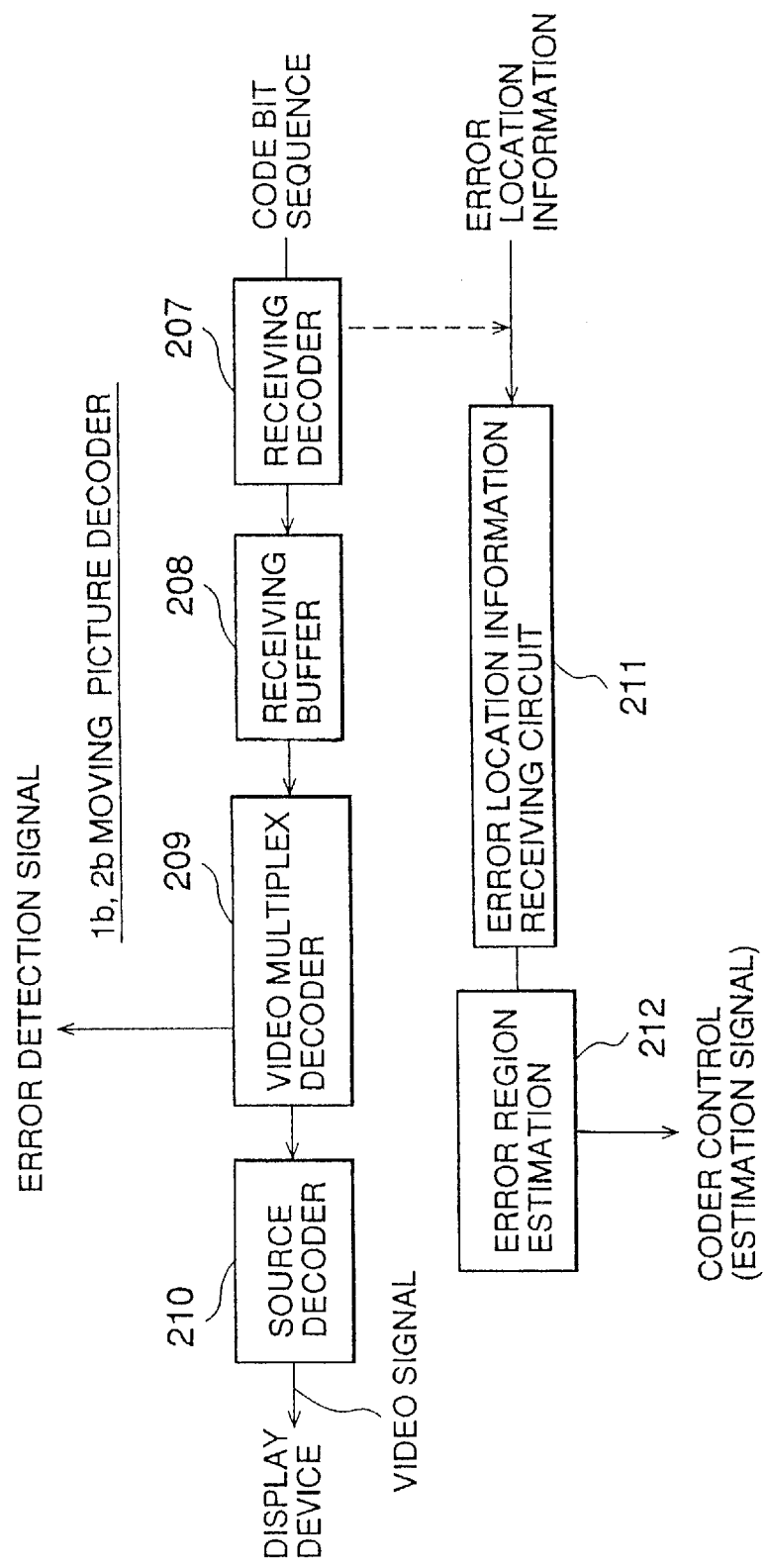
FIG. 4 is a functional diagram illustrating a moving picture decoder according to the first embodiment.

FIG. 4 is a functional diagram illustrating moving picture decoders 1b and 2b. In FIG. 4, each moving picture decoder is constituted of a receiving decoder 207, a receiving buffer 208, a video multiplex decoder 209, a source decoder 210, an error location information receiving circuit 211, and an error affected region estimation circuit 212.

The receiving decoder 207 receives a coded bit sequence from the moving picture coder 1a or 2a and removes a dummy bit. Also, the receiving decoder 207 examines the bit sequence to determine whether or not an error is present, and when an error is found, the decoder 207 corrects the error and sends the result to the receiving buffer 208. The receiving buffer 208 is a memory circuit for guaranteeing a period of time for decoding the received data, and provides the received data to the video multiplex decoder 209 at a desired time.

Taking the hierarchial structure into consideration, the video multiplex decoder 209 performs variable length decoding to extract the compressed data, and transmits the decoded data to the source decoder 210. When the video multiplex decoder 209 extracts the compressed data, contradictions might occur due to an error that cannot be corrected by the receiving decoder 207 (for example, a data string that is not present on a variable length coding table is extracted), and as a result decoding might be impossible. When the decoding cannot be performed, the video multiplex decoder 209 outputs an error detection signal (including information concerning an error location).

The source decoder 210 performs computation for expanding the compressed data, more specifically, it performs inverse quantization and motion compensation, and reproduces resultant video signals on a display device. The error location information receiving circuit 211, which is the feature of the present invention, receives error location information from the reception side moving picture coder, and transmits this information to the error affected region estimation circuit 212. The error location information that is sent from the reception side moving picture coder may be fetched by the receiving decoder 207 and transmitted to the error location information receiving circuit 211.

The error affected region estimation circuit 212 employs the error location information to determine a portion that may be affected by distortion due to an error, and transmits the predicted information to the moving picture coder, which in turn codes, in the intra-frame coding mode, a picture portion that may be affected by the distortion.

FIG. 6 is a diagram for explaining the estimation process performed by the transmission side to determine portions that are affected by an error. In FIG. 6, portions that are expected to be affected by the transmission side are represented by shades 51 and dots 52. The coded data are arranged in ascending order according to the GOB numbers, the macroblock addresses and the block numbers, and are transmitted. A synchronous code is inserted between the individual GOBs for synchronization.

Therefore, when an error is detected at the picture location as is shown in FIG. 6(a), and if the next synchronous code is detected correctly, it is assumed that the shaded portion 51 of the picture frame A cannot be decoded at the reception side. Since the variable length coding has been performed, once an error is detected, a decoding process cannot be performed until the synchronous code that appears next is obtained.

In this embodiment, for a portion that cannot be decoded at the reception side, the identical portion in the preceding frame is displayed. When an error is detected at the reception side, the error location information is forwarded, to the transmission side, as the information for GOB number 5 and macroblock address 21, for the case shown in FIG. 6(a).

According to the coding method that is specified by the ITU-T Recommendation H. 261 in the reference document (1), a motion vector for motion compensation is limited to a range of +15 to −15 pixels vertically and horizontally. Therefore, at most a dotted portion 52 in FIG. 6(b) in the succeeding image frame B may be affected by the shaded portion 51 shown in FIG. 6(a). Further, a portion in the succeeding frame C that may be affected is the one represented by dots 53 in FIG. 6(c).

In this manner, an estimation of what picture portion may be distorted is made at the transmission side and is indicated by the fine shading 54 in FIG. 6(d). When the next frame that the transmission side is to code after receiving the error location information is frame D, the picture distorted portion 54 is coded in the intra-frame coding mode. In addition, when the other portions are to be coded in the inter-frame coding mode, a portion (a roughly shaded portion 55 in FIG. 6(d)) that may be affected by the portion 54 is also coded in the intra-frame coding mode.

(Operation)

The demand refresh operation will now be explained while referring to FIGS. 2, 3 and 4. First, at the transmission side moving picture coding and decoding device, a moving picture is coded by the moving picture coder 1a, and image data for the first through sixth frames are output via the transmission coder 204 to the transmission channel. The reception side moving picture coding and decoding device uses the moving picture decoder 2b to receive and decode the image data in order, beginning with those for the first frame. Suppose that the third frame is received as shown in FIG. 2 and is regarded as frame A. When an error is detected in the image data, the error location information transmission circuit 206 in the reception side moving picture coder 2a transmits, to the transmission side moving picture decoder 1b, a GOB number and a macroblock address of an error location in frame A.

At the transmission side moving picture decoder 1b, the error location information receiving circuit 211 receives the error location information. Upon receipt of this information, the error location is detected and is sent to the error affected region estimation circuit 212. The error affected region estimation circuit 212 employs the error location information to determine the error affected region, and transmits an error affected region estimation signal to the moving picture coder 1a. Consequently, the coding control 205 forcibly codes, in the intra-frame coding mode, a picture portion corresponding to the error affected region that is obtained by the estimation that is made based on the error affected region estimation signal. The coding control 205 codes the remaining picture portions in the inter-frame coding mode or in the intra-frame coding mode. The resultant coded data are transmitted to the reception side as the sixth frame in FIG. 2. The reception side receives it as frame D, performs refreshing on a picture for which the error has been detected, and displays the refreshed picture.

According to the demand refresh system in the first embodiment, when the transmission side has received error location information, it does not always send the entire picture frame in the intra-frame coding mode, and can reduce the amount of code to be transmitted in order to recover the image from the distortion that is due to the error. Since the amount of code can be decreased, finer quantization can be performed, and deterioration of the image, such as block distortion, can be reduced.

More specifically, when a motion vector search range is used in moving picture coding, the transmission side moving picture coding and decoding device can more accurately determine error affected regions.

The transmission side moving picture coding and decoding device performs intra-frame coding for an image data portion that it is assumed to be affected, and performs inter-frame coding or intra-frame coding for the remaining image portions, so that the amount of coded data is not increased.

Therefore, it is possible to provide a moving picture transmission system and a moving picture transmission apparatus which can perform demand refresh more efficiently than it is conventionally, even though the amount of coded moving picture data to be transmitted is not increased and even if a data error occurs as a result of an influence encountered along a transmission channel, so that the quality of decoded images can be enhanced.

[Second embodiment]

Likewise, in a second embodiment, when the transmission side has received error location information M from the reception side, it determines which picture portion may be affected by the error and forcibly codes the picture portion in the intra-frame coding mode, as shown in FIG. 2. It should be noted that a difference from the first embodiment is the method used for determining the image portion affected by the error. According to the method used for the second embodiment, one part of the frame information that was previously coded by the transmission side remains at the transmission side. When the transmission side has received error location information, it uses that information to reduce the size of a portion that is to be coded in the intra-frame coding mode even more than it is reduced by the first embodiment.

The moving picture coder according to the ITU-T Recommendation H. 261 in reference document (1) does not transfer macroblock information when there is no information in the macroblock, i.e., when a motion vector is zero and all transform coefficients are zero. In the second embodiment, therefore, information about whether data are present or absent in the macroblock remains as COD (CODed indication) information on the transmission side. Then, the COD information for all the image frames is used at the transmission side when the estimation is made as to which image portions may be affected by the error.

The COD information that is required is equivalent to the number of frames that are received by the reception side from the time it transmitted the error location information up until it receives refreshed images, i.e., the number of frames F from frame A through frame C in FIG. 2. The COD information for only the latest F frames remains, and the COD information for older frames is abandoned.

Supposing that 0 is left when data are present in the macroblock and 1 is left when data are absent, data bits B which are maintained at the transmission side are, at most, set forth:

$$B=[\text{macroblock count per frame}] \times F \qquad (1)$$

wherein F denotes the number of frames that are received during a period from the time of the transmission of the error location information up until the time of the receipt of the refreshed picture.

For an example shown in FIG. 2 with a picture in the CIF format, the latest COD information of only (33×12)×3 =1188 bits need remain on the transmission side. Accordingly, the hardware load of the moving picture coder can be considerably reduced.

FIGS. 7 and 8 are diagrams for the estimation at the transmission side of ranges that may be affected by an error. In (a1), (b1), (c1) and (d1), on the left, in FIGS. 7 and 8 are shown COD information that is left on the transmission side, and in (a2), (b2), (c2) and (d2), on the right, are shown shaded portions, determined by the transmission side, that may be affected by the error.

As is shown in FIG. 2, when an error is found in frame A on the reception side and is detected at location 71, which is indicated by an X in (a2) in FIG. 7, GOB number 5 and macroblock address 21 are transmitted as error location information from the reception side to the transmission side. When a synchronous code between the GOBs is correctly detected, a portion that can not be decoded by the detected error corresponds to a shaded portion 73.

In the same manner as in the first embodiment, the identical portion in the preceding frame is displayed for the portion that can not be decoded at the reception side. It can be determined by using the COD information ((a1) in FIG. 7) that remains on the transmission side that distortion has occurred only in macroblocks 74 wherein data are present. Thus, a portion, determined by the transmission side, that can not be decoded at the reception side is smaller than that in the first embodiment.

As well as for the first embodiment, since a motion vector is limited to a range of ±15 pixels vertically and horizontally, the portion that may be affected by the error when the reception side decodes the next image frame B is a region 72 in (b2) in FIG. 7. Since the COD information ((b1) in FIG. 7) for the frame B is also maintained on the transmission side, it can be determined by using the COD information that the error does not affect a macroblock wherein no data are present. Further, the range of a motion vector and the COD information of the frame C are used in the same manner, so that a region 81 in (c2) in FIG. 8 corresponds to a portion that may be affected by the error. Thus, only a region 82 in (d2) in FIG. 8 is required to be forcibly coded in the intra-frame coding mode when the error location information is sent to the transmission side.

According to the demand refresh system of the second embodiment, when error location information is received by the transmission side, not all of the macroblocks in the succeeding picture frame are necessarily transmitted in the intra-frame coding mode. Only one part needs to be coded in the intra-frame coding mode, and as a result, the amount of code to be transmitted can be reduced. As the amount of code is reduced, finer quantization can be performed and deterioration of the picture, such as block distortion, can be reduced. Since only a small amount of information needs to remain on the transmission side, the hardware load is small.

More specifically, in addition to the advantages of the first embodiment, to perform the compression and the coding of a moving picture, the moving picture coding and decoding device includes means for storing, for each predetermined region (macroblock), information concerning whether or not coded data is present (verifying the presence or absence of data by using the COD information). Further, the moving picture coding and decoding device employs the above COD information to determine an error affected region, so that an assumption of the error affected region can efficiently and accurately be made.

It is therefore possible to provide a moving picture transmission system and a moving picture transmission apparatus that can perform demand refreshing more efficiently than it is performed conventionally, though the amount of code for moving picture data that are to be transmitted is not increased and even if a data error occurs as a result of an influence encountered along a transmission channel, so that the quality of a decoded image can be enhanced.

[Third embodiment]

FIG. 9 is a diagram for explaining a demand refresh system according to a third embodiment of the present invention. As in FIG. 2, the elapse of time is calculated from the left to the right, and a transmission side codes each picture frame and transmits the coded frame to the reception side. The dimension of each shaded rectangular represents the amount of code that is to be transmitted for one picture frame.

In the first and the second embodiments, information M for error detected location in one picture frame is transmitted as an error notification. In the third embodiment, information N for a picture portion (range) that can not be decoded by the reception side is transmitted as an error notification.

Further, in this embodiment, when the transmission side has received the information N for the picture portion that can not be decoded by the reception side, for several frames beginning with the picture frame that is distorted by the error and continuing up to the image frame preceding the frame that is to be transmitted, i.e., for the three frames (frames A through C) in FIG. 9, the transmission side determines which picture portion may be distorted by the error or by the transmission of the error, and which image portion may be affected by distortion when coding is to be performed in the inter-frame coding mode. Only the picture portions that the transmission side determines it to be affected are forcibly coded in the intra-frame coding mode. The other image portions are coded in a normal manner.

Moving picture coders 1a' and 2a' in the third embodiment are designed almost the same as those in the first and the second embodiments. As the feature of these coders in this embodiment, the information N that is sent from the reception side as the disabled decoding picture portion is employed by the transmission side to determine the portion, within the picture frame that is decoded by the reception side, that may be affected by distortion due to the error.

FIG. 10 is a diagram for explaining the estimation process performed by the transmission side to determine portions that may be affected by the error. In FIG. 10, portions that are assumed to be affected portions are represented by shades and dots. Coded data are arranged in ascending order according to the GOB numbers, the macroblock addresses and the block numbers, and are transmitted. A synchronous code is inserted between the GOBs for synchronization. In FIG. 10(a) is shown an example wherein an error was detected and the succeeding synchronous code can not be correctly detected. At this time, it is assumed that a shaded portion 101 in picture frame A is not decoded by the reception side.

Figure 10A:
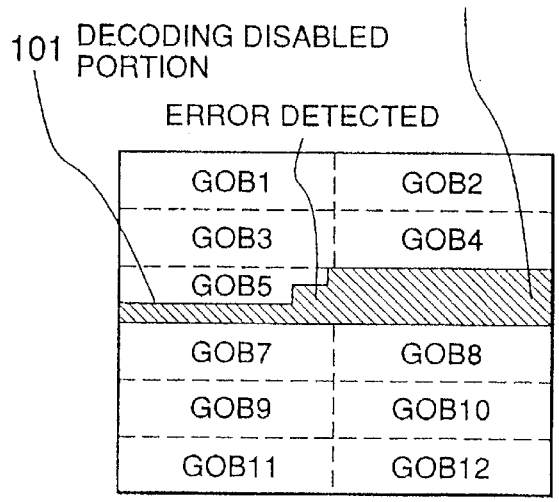
FIG. 10 is a diagram for explaining the process for the third embodiment by which a transmission side determines portions that may be affected by errors in frames A through D.
Figure 10B:
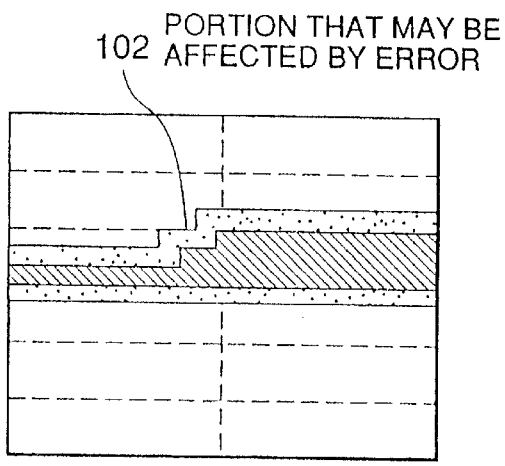

As well as in the first and the second embodiments, for the portion that can not be decoded by the reception side, the identical portion of the preceding frame is displayed. Once an error is detected by the reception side, information concerning the picture portion that can not be decoded by the reception side (hereinafter referred to as "decoding disabled range information"), i.e., from GOB number 5 and macroblock address 21 to GOB number 6 and macroblock address 33 in FIG. 10(a), is transmitted to the transmission side. As in the first embodiment, since the motion vector for motion compensation is limited to a range of ±15 pixels vertically and horizontally, a dotted portion 102 in FIG. 10(b) corresponds to a portion in succeeding image frame B that may be affected by the shaded portion 101 in FIG. 10(a).

Figure 10C:
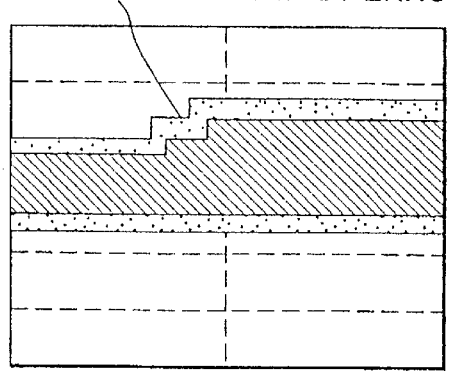
Figure 10D:
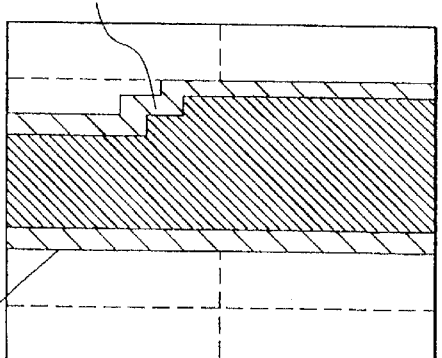

Further, a picture portion in the next image frame C that may be affected is a dotted portion 103 in FIG. 10(c). In the same manner, a picture portion that may be distorted is determined by the transmission side as shown as a portion 104 that is represented by fine shading in FIG. 10(d) When succeeding frame D is coded by the transmission side upon receipt of the decoding disabled range information, the portion 104 is coded in the intra-frame coding mode. In addition, a roughly shaded portion 105 in FIG. 10(d), which will be affected by the portion 104 when the other portions are coded in the inter-frame coding mode, is coded in the intra-frame coding mode.

According to the demand refresh system of the third embodiment, the same advantages can be achieved as are obtained by the first embodiment. Further, when the information for the picture portion that can not be decoded by the reception side is received by the transmission side, not all the macroblocks in the succeeding picture frame are necessarily transmitted in the intra-frame coding mode. Only one part of the macroblocks needs to be coded in the intra-frame coding mode.

The difference between the third embodiment and the first and the second embodiments is that a picture portion that may be erroneously transmitted can be refreshed even though a synchronous code that immediately follows the error detected location can not be detected.

More specifically, the transmission side moving picture coding and decoding device estimates the error affected region by utilizing a motion vector search range for moving picture coding, and thus the accuracy of the estimation can be improved.

The transmission side moving picture coding and decoding device performs intra-frame coding for the predicted image data portion, and performs inter-frame coding or intra-frame coding for the other picture portions, so that the amount of coded information will not be increased.

Therefore, for the transmission of coded moving picture data, it is possible to provide a moving picture transmission system and a moving picture transmission apparatus that can perform demand refreshing more efficiently than it is performed conventionally without the amount of code to be transmitted being increased, even if a data error occurs as a result of an influence encountered along a transmission channel, so that the quality of a decoded image can be improved.

[Other embodiments]

(1) In the first trough the third embodiments, the coding method described in ITU-T Recommendation H. 261 in reference document (1) has been employed as an example. Another method, including the divisions of a picture frame and the range of a motion vector, can be employed.

(2) In the first and the second embodiments, it's assumed that the synchronous code that immediately follows the error detected location can always be acquired. Since "a synchronous code can not be acquired" is included in "an error has been detected," information for the location at which the synchronous code could not be acquired may be transmitted as an error notification to the transmission side. In other words, under the condition in FIG. 6(a), GOB number 5 macroblock address 21 and GOB number 6 macroblock address 1 are transmitted as error location information to the transmission side.

If a plurality of error locations are transmitted as error notices per one picture frame from the reception side to the transmission side, image data can be satisfactorily refreshed even though the synchronous code that immediately follows the error detected location can not always be acquired.

(3) In addition, in the same manner as the second embodiment is developed from the first embodiment by using the COD information, in the third embodiment, COD information is retained in the transmission side to reduce a portion to be refreshed.

(4) Further, the moving picture decoders 1b and 2b include the error affected region estimation circuit 212 in FIG. 4. For another embodiment, the error affected region estimation circuit 212 can be included in the moving picture coders 1a and 2a. The same advantage can be so obtained as is acquired when an error affected region is determined and coding control is performed by using the error location information of the error location information receiving circuit 211 of the moving picture decoder 1b or 2b.

(5) In the above embodiments, the picture coding method described in ITU-T Recommendation H. 261 has been employed, and the present invention can be applied to MPEG-1, which is a moving picture coding method for storage media (e.g., video CD). More specifically, the present invention can be applied for a DV-I (Digital Video Interactive) that is based on CD-ROM. Further, the present invention can be applied to a television conference system and a television telephone system.

(6) Furthermore, the present invention can be used for MPEG-2, which is a media integration picture coding method, and more specifically, for a digital HDTV system.

As is described above, according to the present invention, a moving picture transmission device for decoding includes information transmission means that, when an error is detected in picture frame data that are obtained by decoding coded moving picture data, or when a disabled decoding image range for the coded moving picture data is detected, transmits the error detected location as error detected location information or the disabled decoding image range as decoding disabled range information to the moving picture transmission device for coding. Further, the moving picture transmission device for coding includes the estimation means, which identifies the error detected location in the picture frame by using the received error detected location information, or the decoding disabled range by using the received decoding disabled range information, and which determines a picture portion that may be affected by the identified error detected location or by the picture data in the decoding disabled range, and the refreshed picture transmission means, which compresses and codes the picture data by using the result obtained by the estimation means to produce refreshed picture data, and transmits the refreshed picture data to the moving picture transmission device for decoding. As a result, a moving picture transmission system and a moving picture transmission apparatus can be provided wherein the amount of code to be transmitted is not increased, and demand refreshing is performed more efficiently than it is performed conventionally, even if a data error has occurred as a result of an influence encountered along a transmission channel, so that the quality of a decoded picture can be improved.

What is claimed is:

1. A moving picture transmission system comprising:
  a first moving picture transmission device for receiving moving picture data, for compressing and coding the moving picture data and for outputting resultant coded moving picture data; and
  a second moving picture transmission device for decoding the resultant coded moving picture data;
  said second moving picture transmission device including information transmission means for, when an error is detected in data for a picture frame that is obtained by decoding the resultant coded moving picture data, transmitting error detection location information which indicates a location of the error that is detected, to said first moving picture transmission device;
  said first moving picture transmission device including estimation means for identifying the error location in a picture frame, from the error detection location information that is received, and for making an estimation as to which portion of the moving picture data is affected by the error, said portion of the moving picture data including at least moving picture data corresponding to a portion of the picture frame in which the error is detected and a portion of each subsequent error affected picture frame; and said first moving picture transmission device further including refreshed picture transmission means for generating refreshed picture data by compressing and coding the moving picture data by using a result obtained by said estimation means and for transmitting the refreshed picture data to said second moving picture transmission device.

2. A moving picture transmission system according to claim 1, wherein said first moving picture transmission device performs intra-frame coding for data for the portion of the moving picture data that is estimated by said estimating means, and performs inter-frame coding or intra-frame coding for all remaining portions of the moving picture data.

3. A moving picture transmission system according to claim 1, wherein, for compression and coding of moving pictures, said first moving picture transmission device further includes coded indication information memory means for storing, for each predetermined region of the moving picture data, coded indication information concerning whether or not coded information is present, and wherein said estimation means uses said coded indication information for making the estimation.

4. A moving picture transmission system according to claim 3, wherein said first moving picture transmission device performs intra-frame coding for data for the portion of the moving picture data that is estimated by said estimation means, and performs inter-frame coding or intra-frame coding for all remaining portions of the moving picture data.

5. A moving picture transmission system according to claim 1, wherein said estimation means of said first moving picture transmission device uses a motion vector search range when making the estimation.

6. A moving picture transmission system according to claim 5, wherein said first moving picture transmission device performs intra-frame coding for data for the portion of the moving picture data that is estimated by said estimation means, and performs inter-frame coding or intra-frame coding for all remaining portions of the moving picture data.

7. A moving picture transmission system according to claim 5, wherein, for compression and coding of moving pictures, said first moving picture transmission device further includes coded indication information memory means for storing, for each predetermined region of the moving picture data, coded indication information concerning whether or not coded information is present, and wherein said estimation means uses said coded indication information for making the estimation.

8. A moving picture transmission system according to claim 7, wherein said first moving picture transmission device performs intra-frame coding for data for the portion of the moving picture data that is estimated by said estimation means, and performs inter-frame coding or intra-frame coding for all remaining portions of the moving picture data.

9. A moving picture transmission system comprising:
  a first moving picture transmission device for receiving moving picture data, for compressing and coding the moving picture data and for outputting resultant coded moving picture data; and
  a second moving picture transmission device for decoding the resultant coded moving picture data;
  said second moving picture transmission device including information transmission means for, when a picture range of the resultant coded moving picture data cannot be decoded, transmitting decoding disabled range information which indicates the picture range that cannot be decoded, to said first moving picture transmission device;
  said first moving picture transmission device including estimation means for identifying a decoding disabled range from said decoding disabled range information that is received, and for making an estimation as to which portion of the moving picture data is affected by the decoding disabled range, said portion of the moving picture data including at least moving picture data corresponding to a portion of a picture frame in which a picture range cannot be decoded and a portion of each subsequent decoding disabled range affected picture frame; and said first moving picture transmission device further including refreshed picture transmission means for generating refreshed picture data by compressing and coding the moving picture data by using a result obtained by said estimation means and for transmitting the refreshed picture data to said second moving picture transmission device.

10. A moving picture transmission system according to claim 9, wherein said first moving picture transmission device performs intra-frame coding for data for the portion of the moving picture data that is estimated by said estimation means, and performs inter-frame coding or intra-frame coding for all remaining portions of the moving picture data.

11. A moving picture transmission system according to claim 9, wherein, for compression and coding of moving pictures, said first moving picture transmission device further includes coded indication information memory means for storing, for each predetermined region of the moving picture data, coded indication information concerning whether or not coded information is present, and wherein said estimation means uses said coded indication information for making the estimation.

12. A moving picture transmission system according to claim 11, wherein said first moving picture transmission device performs intra-frame coding for data for the portion of the moving picture data that is estimated by said estimation means, and performs inter-frame coding or intra-frame coding for all remaining portions of the moving picture data.

13. A moving picture transmission system according to claim 9, wherein said estimation means of said first moving picture transmission device uses a motion vector search range when making the estimation.

14. A moving picture transmission system according to claim 13, wherein said first moving picture transmission device performs intra-frame coding for data for the portion of the moving picture data that is estimated by said estimation means, and performs inter-frame coding or intra-frame coding for all remaining portions of the moving picture data.

15. A moving picture transmission system according to claim 13, wherein, for compression and coding of moving pictures, said first moving picture transmission device further includes coded indication information memory means for storing, for each predetermined region of the moving picture data, coded indication information concerning whether or not coded information is present, and wherein said estimation means uses said coded indication information for making the estimation.

16. A moving picture transmission system according to claim 15, wherein said first moving picture transmission device performs intra-frame coding for data for the portion of the moving picture data that is estimated by said estimation means, and performs inter-frame coding or intra-frame coding for all remaining portions of the moving picture data.

17. A moving picture transmission apparatus, for compressing and coding moving picture data and for outputting coded moving picture data, comprising:

estimation means for identifying a location of an error in a picture frame, upon receipt of error detection location information obtained by a decoding side during decoding of the coded moving picture data, and for making an estimation as to which portion of the moving picture data is affected by said error, said portion of the moving picture data including at least moving picture data corresponding to a portion of the picture frame in which the error is detected and a portion of each subsequent error affected picture frame; and refreshed picture transmission means for generating refreshed picture data by compressing and coding the moving picture data by using a result obtained by said estimation means and for outputting the refreshed picture data.

18. A moving picture transmission apparatus according to claim 17, wherein said apparatus performs intra-frame coding for data for the portion of the moving picture data that is estimated by said estimation means, and performs inter-frame coding or intra-frame coding for all remaining portions of the moving picture data.

19. A moving picture transmission apparatus according to claim 17, wherein, for compression and coding of moving pictures, said apparatus further includes coded indication information memory means for storing, for each predetermined region of the moving picture data, coded indication information concerning whether or not coded information is present, and wherein said estimation means uses said coded indication information for making the estimation.

20. A moving picture transmission apparatus according to claim 19, wherein said apparatus performs intra-frame coding for data for the portion of the moving picture data that is estimated by said estimation means, and performs inter-frame coding or intra-frame coding for all remaining portions of the moving picture data.

21. A moving picture transmission apparatus according to claim 17, wherein said estimation means uses a motion vector search range when making the estimation.

22. A moving picture transmission apparatus according to claim 21, wherein said apparatus performs intra-frame coding for data for the portion of the moving picture data that is estimated by said estimation means, and performs inter-frame coding or intra-frame coding for all remaining portions of the moving picture data.

23. A moving picture transmission apparatus according to claim 21, wherein, for compression and coding of moving pictures, said apparatus further includes coded indication information memory means for storing, for each predetermined region of the moving picture data, coded indication information concerning whether or not coded information is present, and wherein said estimation means uses said coded indication information for making the estimation.

24. A moving picture transmission apparatus according to claim 23, wherein said apparatus performs intra-frame coding for data for the portion of the moving picture data that is estimated by said estimation means, and performs inter-frame coding or intra-frame coding for all remaining portions of the moving picture data.

25. A moving picture transmission apparatus, for compressing and coding moving picture data and for outputting coded moving picture data, comprising:

estimation means for identifying a decoding disabled range, upon receipt of decoding disabled range information concerning a picture range of the coded moving picture data for which decoding is disabled by a decoding side, and for making an estimation as to which portion of the moving picture data is affected by said decoding disabled range, said portion of the moving picture data including at least moving picture data corresponding to a portion of a picture frame in which a picture range cannot be decoded and a portion of each subsequent decoding disabled range affected picture frame; and refreshed picture transmission means for generating refreshed picture data by compressing and coding the moving picture data by using a result obtained by said estimation means and for outputting the refreshed picture data.

26. A moving picture transmission apparatus according to claim 25, wherein said apparatus performs intra-frame coding for data for the portion of the moving picture data that is estimated by said estimation means, and performs inter-frame coding or intra-frame coding for all remaining portions of the moving picture data.

27. A moving picture transmission apparatus according to claim 25, wherein, for compression and coding of moving pictures, said apparatus further includes coded indication information memory means for storing, for each predetermined region of the moving picture data, coded indication information concerning whether or not coded information is present, and wherein said estimation means uses said coded indication information for making the estimation.

28. A moving picture transmission apparatus according to claim 27, wherein said apparatus performs intra-frame coding for data for the portion of the moving picture data that is estimated by said estimation means, and performs inter-frame coding or intra-frame coding for all remaining portions of the moving picture data.

29. A moving picture transmission apparatus according to claim 25, wherein said estimation means uses a motion vector search range when making the estimation.

30. A moving picture transmission apparatus according to claim 29, wherein said apparatus performs intra-frame coding for data for the portion of the moving picture data that is estimated by said estimation means, and performs inter-frame coding or intra-frame coding for all remaining portions of the moving picture data.

31. A moving picture transmission apparatus according to claim 29, wherein, for compression and coding of moving pictures, said apparatus further includes coded indication information memory means for storing, for each predetermined region of the moving picture data, coded indication information concerning whether or not coded information is present, and wherein said estimation means uses said coded indication information for making the estimation.

32. A moving picture transmission apparatus according to claim 31, wherein said apparatus performs intra-frame coding for data for the portion of the moving picture data that is estimated by said estimation means, and performs inter-frame coding or intra-frame coding for all remaining portions of the moving picture data.

* * * * *